(12) United States Patent
Holly et al.

(10) Patent No.: US 7,564,665 B2
(45) Date of Patent: Jul. 21, 2009

(54) PAD ESD SPREADING TECHNIQUE

(75) Inventors: Patrick J. Holly, Tempe, AZ (US);
David Rodriguez, Phoenix, AZ (US);
David R. Rice, Phoenix, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 0 days.

(21) Appl. No.: 11/621,724

(22) Filed: Jan. 10, 2007

(65) Prior Publication Data

US 2008/0165459 A1 Jul. 10, 2008

(51) Int. Cl.
*H02H 9/00* (2006.01)
(52) U.S. Cl. ....................................... 361/56
(58) Field of Classification Search ..................... 361/56
See application file for complete search history.

(56) References Cited

U.S. PATENT DOCUMENTS

| | | | |
|---|---|---|---|
| 5,168,178 A * | 12/1992 | Allen et al. ................... | 326/49 |
| 5,208,719 A | 5/1993 | Wei | |
| 5,223,737 A | 6/1993 | Canclini | |
| 5,707,886 A | 1/1998 | Consiglio et al. | |
| 5,717,560 A | 2/1998 | Doyle et al. | |
| 5,907,464 A | 5/1999 | Maloney et al. | |
| 5,956,219 A | 9/1999 | Maloney | |
| 6,008,970 A | 12/1999 | Maloney et al. | |
| 6,157,065 A | 12/2000 | Huang et al. | |
| 6,577,481 B2 | 6/2003 | Steinhoff et al. | |
| 6,690,555 B1 | 2/2004 | Pasqualini | |
| 6,744,610 B2 | 6/2004 | Chang et al. | |
| 6,747,501 B2 | 6/2004 | Ker et al. | |
| 6,760,209 B1 | 7/2004 | Sharpe-Geisler | |
| 6,768,176 B1 | 7/2004 | Litfin | |
| 6,788,507 B2 | 9/2004 | Chen et al. | |
| 6,800,906 B2 | 10/2004 | Cheng | |
| 6,829,126 B2 | 12/2004 | Lee et al. | |
| 6,838,775 B2 | 1/2005 | Takahashi | |
| 6,844,595 B2 | 1/2005 | Chen | |

(Continued)

OTHER PUBLICATIONS

Timothy J. Maloney, Steven S. Poon and Lawrence T. Clark; "Methods for Designing Low-leakage Power Supply Clamps"; Proceedings of Electrical Overstress Electrostatic Discharge Symposium; 2003, 7 pages; Intel Corporation.

*Primary Examiner*—Ronald W Leja
*Assistant Examiner*—Christopher J Clark
(74) *Attorney, Agent, or Firm*—Meyertons Hood Kivlin Kowert & Goetzel, P.C.; Jeffrey C. Hood

(57) ABSTRACT

A system, e.g. an integrated circuit or part, may include a plurality of pads, e.g. digital I/O pads, each comprising a physical pad and associated pad circuit. In case of an ESD event affecting one or more of the digital I/O pads, PMOS devices configured in an output buffer section between an I/O pad supply rail and the physical output pad—within their respective pad circuits in the affected digital I/O pads—may all be turned on in response to the ESD event. This may allow the capacitance of each pad, in some cases approximately 3 pF capacitance per pad, to charge up, absorbing the energy of the ESD event and reducing the peak voltage the integrated circuit or part experiences as a result of the ESD event. The reduced peak voltage may be directly correlated with improved ESD performance of the product.

18 Claims, 1 Drawing Sheet

U.S. PATENT DOCUMENTS

| | | |
|---|---|---|
| 6,864,536 B2 | 3/2005 | Lin et al. |
| 6,876,529 B2 | 4/2005 | Li |
| 7,019,366 B1 | 3/2006 | Yang et al. |
| 7,102,862 B1 * | 9/2006 | Lien et al. ..................... 361/56 |
| 7,106,563 B2 | 9/2006 | Lai et al. |
| 2006/0001448 A1 * | 1/2006 | Seo et al. ..................... 326/80 |
| 2007/0019345 A1 * | 1/2007 | Loh et al. ..................... 361/56 |

* cited by examiner

PAD ESD SPREADING TECHNIQUE

BACKGROUND OF THE INVENTION

1. Field of the Invention

This invention relates generally to the field of integrated circuit design and, more particularly, to the design of protection circuitry for providing protection against damaging effects of Electrostatic Discharge (ESD).

2. Description of the Related Art

Integrated circuits (ICs) are typically manufactured with external connections—most commonly pins—for coupling to external devices, systems, signals and/or power supply voltages. More recently, IC design and manufacturing has been trending towards an increase in the density of internal components, most commonly transistors and device interconnects, with a concurrent decrease in the power supply voltage levels used in operating the ICs. As IC devices increase in density and operating supply voltage levels decrease, the IC devices may become more sensitive to the effects of electrostatic discharge (ESD).

ESD many times originates from build up of static charge near the IC or on a human handling the IC, leading to extremely high voltages developed near the IC, and typically results in an electrical discharge of very high current for a short duration. Therefore, ESD poses a serious problem for semiconductor devices as it can potentially lead to malfunction and/or the destruction of an entire IC. In addition, the physical dimensions of circuit elements in many ICs, for example in microprocessors, have seen a decrease with each new generation of manufacturing process. Although smaller dimensions lead to an increase in IC operating speeds, they also have an adverse impact by increasing the sensitivity of circuit elements, such as field effect transistors (FETs), to high electric fields. One technique employed in overcoming this increased sensitivity has been to reduce the operating voltage of an IC. However, as supply voltages are scaled down (from 5.0 volts, to 3.3 volts, to 2.5, to 1.8 volts, for example), there is typically a need to maintain backward compatibility with the higher voltage requirements of older ICs.

In order to maintain compatibility with previous generations of semiconductor products and devices, it has been necessary to provide ICs with interface circuits that are interoperable with older generation ICs requiring higher supply voltages. One result of this has been the practice of designing ICs having a core operated using a first power supply voltage, and Input/Output (I/O) circuitry, typically around the physical periphery of the IC, operated using a higher power supply voltage. Since ESD events often occur across the silicon circuits attached to the package terminals, or pins, of an IC, circuit designers have concentrated their efforts on developing adequate protection mechanisms for these sensitive circuits. Often the design of ESD protection circuits has to satisfy high performance requirements. For example, one of the primary industry standards for measuring ESD robustness (MIL-STD-883C method 3015.7 Notice 8 (1989), and the subsequent Human Body Model (HBM) standard No. 5.1 (1993) from the EOS/ESD Association) requires ESD zapping for what can be a large number of pin and power supply combinations.

Generally formulated, protection against effects of ESD requires sensing either a predetermined voltage level, or the fast rate of voltage change resulting from an ESD pulse that might affect an integrated circuit component or an entire chip. The pins that require the ESD protection must generally be tolerant to voltages above the highest voltage tolerance of the typical FETs used in the fabrication process. Trigger circuits that may be used to turn on a clamp in response to any incoming ESD pulse would therefore have to be high voltage tolerant. In the past, ESD protection circuits have had difficulty meeting these stringent requirements while maintaining adequate noise immunity and without increasing the required silicon area.

In general, various techniques for improving ESD performance, including the use of semiconductor controlled rectifiers (SCRs), snapback devices, and rail clamps, have been devised, published and/or patented.

Other corresponding issues related to the prior art will become apparent to one skilled in the art after comparing such prior art with the present invention as described herein.

SUMMARY OF THE INVENTION

In one set of embodiments, a robust electrostatic discharge (ESD) structure for a variety of digital input/output (I/O) pads may be achieved. Output PMOS devices comprised in the output buffer of the pad and coupled between an I/O pad supply rail and the output pad may be enabled in response to an ESD event, to charge a pad capacitance (which, in some cases, may be approximately 3 pF) corresponding to the physical pad or pad cell, to spread out the energy generated by the ESD event, resulting in a lower peak voltage and therefore better ESD performance. By configuring all of the pads comprised within the system, (e.g. integrated circuit or part), to operate this way, the ESD energy may be shared by the respective pad capacitances corresponding to all the pads, thereby reducing the maximum voltage that may develop in the system as a result of the ESD event. This method may be employed as an additional technique to be used in conjunction with other established solutions, such as various clamp devices and clamp circuits, for example, allowing improved ESD performance over the established solutions used alone.

In one set of embodiments, an I/O pad circuit associated with a physical pad may comprise three main sections: an output buffer that may also include an ESD clamp device, a clamp control circuit, and a functional control block. The clamp control circuit may be supplied power by an ESD power rail that is activated by the energy of the ESD event, and may be triggered/enabled according to an RC time constant associated with a slope, or rise time, of a voltage pulse that may activate the ESD power rail. In an ESD event, the clamp control circuit may perform at least two different operations. It may turn on the clamp device in the output buffer, where the clamp device is coupled between the ESD power rail and a low supply rail, and may also send a signal to the functional control block, to instruct the functional control block to turn on the p-channel output device(s)—e.g. PMOS device(s)—comprised in the output buffer. By turning on the p-channel devices, while disabling n-channel devices—e.g. NMOS devices—that may also be comprised in the output buffer, and coupled to the PMOS device(s), the functional control block may operate to couple the high supply rail (i.e. the pad power rail) and its associated capacitance (such as all the other pad cells) to the pad affected by the ESD event, thus charge sharing the ESD pulse, thereby reducing the maximum voltage developed in the part comprising the pads. The reduced voltage correlates to improved part reliability. This technique may be used in conjunction with other established solutions, such as clamp devices and active clamp circuits, allowing improved ESD performance over other established solutions being used alone.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
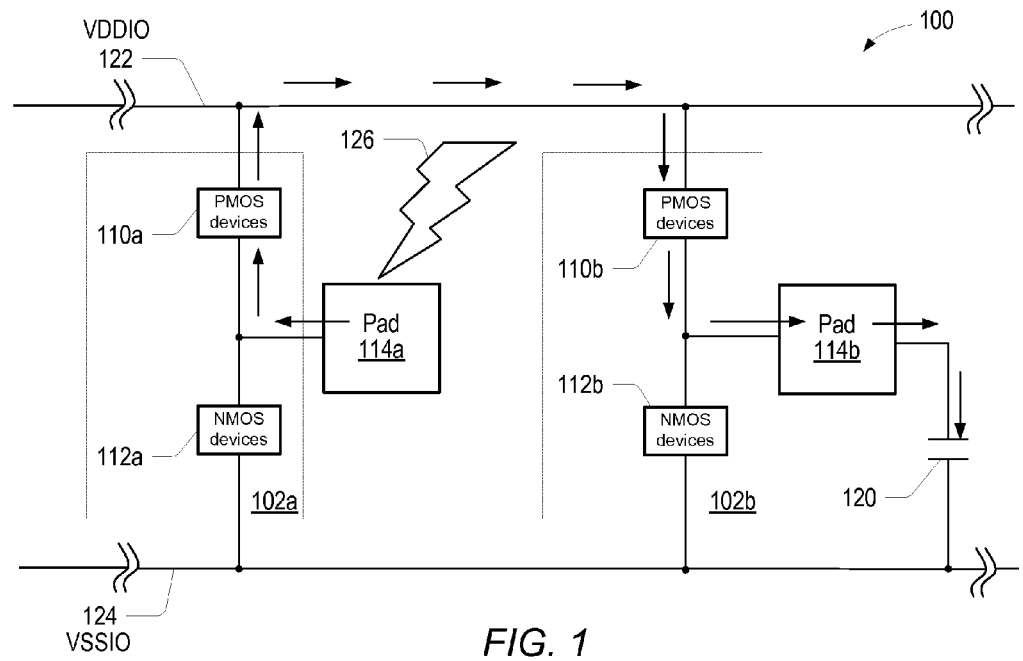
FIG. 1 shows the partial block diagram of one embodiment of a system in which pads have been configured to share a charge developed as a result of an electrostatic discharge (ESD) event, to reduce the maximum voltage developed in the system as a result of the ESD event.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

In one set of embodiments, a more robust electrostatic discharge (ESD) structure for a variety of variable input/output (I/O) pads may be realized. In one set of embodiments, output PMOS devices comprised in the output buffer of a pad, for example a digital I/O pad, may be enabled in response to an ESD event, to charge a pad capacitance (which may be approximately 3 pF) corresponding to the physical pad or pad cell, to spread out the ESD energy, which may result in a lower peak voltage and therefore better ESD performance. By configuring all of the pads comprised within the system, or integrated circuit, to operate this way, the ESD energy may be shared by the respective pad capacitances corresponding to all the pads, thereby reducing the maximum voltage that may develop in the system as a result of the ESD event (or of the energy of the ESD event). This method may be employed as an additional technique to be used in conjunction with other established solutions, such as various clamp devices and clamp circuits, for example, allowing improved ESD performance over the established solutions used alone.

FIG. 1 shows the partial block diagram of pads comprised in a system 100, for example an integrated circuit, and configured to share a charge developed as a result of an electrostatic discharge (ESD) event, to reduce the maximum voltage developed in the system as a result of the ESD event. Each pad may comprise a physical pad (114a and 114b) and a corresponding pad circuit (102a and 102b, respectively). Each physical pad may have an associated pad capacitance, shown in FIG. 1 only for pad 114b, where capacitor 120 symbolizes the pad capacitance associated with pad 114b. The pads may be coupled between an I/O supply/voltage pad rail (VDDIO) 122, which may be a variable I/O pad rail in some embodiments, and low supply/voltage (VSSIO) rail 124, where VSSIO rail 124 has a lower value than VDDIO rail 124. Pad circuit 102a may be configured such that in case of an ESD event 126 affecting pad 114a, pad circuit 102a may turn on PMOS devices 110a in response to the energy of the ESD event, while keeping NMOS devices 112a and 112b turned off, resulting in charge flowing from pad 114a to pad capacitance 120 through PMOS devices 110a and 110b. Although only two pads are shown in FIG. 1, any and all pads similarly configured between VDDIO rail 122 and VSSIO rail 124 may have their respective PMOS devices turned on (including pad circuit 102a), resulting in the charge being shared across all pads (pads 114a and 114b shown in FIG. 1), that is, across the respective pad capacitances associated with all the pads. This may effectively reduce the maximum, or peak, voltage developed in the circuit, or system, as a result of ESD event 126.

Figure 2:
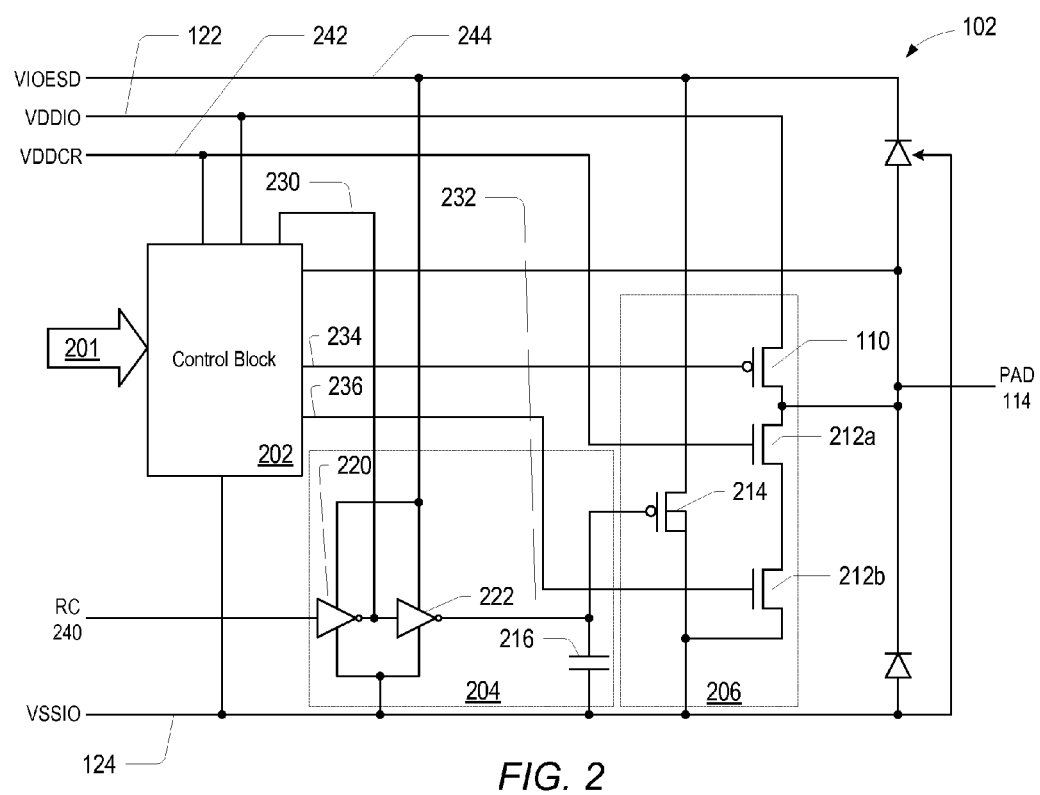
FIG. 2 shows a partial circuit diagram of one embodiment of a pad circuit configured to turn on PMOS devices in its output buffer to charge a corresponding pad capacitance to reduce the maximum voltage developed in the system as a result of the ESD event.

FIG. 2 shows a partial circuit diagram of one embodiment of a pad circuit 102 (which may be an embodiment of pad circuit 102a and/or 102b, for example) configured to turn on PMOS devices 110 in its output buffer 206 to charge a corresponding pad capacitance to reduce the maximum voltage developed in the system as a result of ESD event 126. It should be noted that the terms "buffer" and "output buffer" are used herein in the context of electrical and/or integrated circuits to denote signal driver circuits, as opposed to a programming/data transmission context, where the terms are commonly used to denote data structures or memory elements used to hold data/and or information. In pad circuit 102, PMOS device 110 represents one or more PMOS devices coupled between VDDIO rail 122 and PAD 114. In case of multiple PMOS devices 110, the PMOS devices may be coupled in parallel, that is, their respective drain terminals coupled together and their respective source terminals coupled together. Control block 202 may contain logic circuitry to perform various functions associated with pad circuit 102, for example receiving I/O data, address information, and various system control signals 201 in order to perform I/O functions for the system. It should be noted that control block 202 may contain digital, analog, and/or mixed-mode circuitry configured to perform the various functions assigned to control block 202 as set forth herein and further described below. Those skilled in the art will appreciate that control block 202 may be implemented in a variety of ways to achieve the functionality of control block 202 as set forth herein, and the embodiment shown in FIG. 2 is meant to be exemplary and in no way limiting.

One of the functions that may be performed by control block 202 is the control of output buffer 206 to drive an output signal at pad 114. In one embodiment, control block 202 uses control signal 234 (which may be a control signal bus comprising multiple signal lines in case of multiple PMOS devices) to control the gate (or gates) of PMOS device(s) 110 to enable/disable PMOS device(s) 110. Similarly, control block 202 may use control signal(s) 236 to control the gate of NMOS device(s) 212b to enable/disable NMOS device(s) 212b. NMOS devices(s) 212b may be coupled between PAD 114 and VSSIO rail 124, operating together with PMOS device(s) 110 to drive the output signal at PAD 114 as per the function of output buffer 206. An internal high supply rail VDDCR 242 may be configured to provide power to various functional blocks within the system, including at least a portion of the circuitry inside control block 202, and in addition to enabling NMOS device 212a. Pad circuit 102 may also include a supply rail (VIOESD) 244 used to power up clamp control circuit 204. In one embodiment, clamp control circuit 204 comprises inverters 220 and 222 coupled in series, and is operable to provide an ESD control signal 230 to control block 202. ESD control signal 230 may be asserted in response to the ESD event to instruct control block 202 to turn on PMOS devices 110.

When an ESD event occurs, the fast ramp rate of a voltage spike on VIOESD rail 244 may result in VIOESD rail 244 providing increased power to clamp control circuit 204, thereby facilitating clamp control circuit 204 asserting ESD control signal 230. Based on the asserted ESD control signal 230, clamp control circuit 204 may also turn on clamp device 214 configured to shunt VIOESD rail 244 and VISSIO rail 124, thereby absorbing at least a portion of the energy generated by the ESD event. Those skilled in the art will appreciate that while the clamp device shown in FIG. 2 is a PMOS device, in alternate embodiments clamp device 214 may be an NMOS device or any other device configurable to absorb at least a portion of the energy generated by the ESD event, and clamp device 214 is not limited to the use of a PMOS device. Clamp control circuit 204 may also include capacitor 216 configured to aid in turning on clamp device 214. As mentioned above, in response to being powered by the ESD event, clamp control circuit 204 may assert ESD control signal 230 to instruct control block 202 to enable PMOS device(s) 110, while disabling or keeping disabled NMOS device(s) 212b. By enabling (i.e. turning on) PMOS device(s) 110, control block 202 effectively connects VDDIO rail 122 and its associated capacitance (which may comprise all the other pads or pad cells) to the physical pad affected by the ESD event, thereby sharing the charge generated by the ESD event, reducing the maximum voltage developed in the system as the result of the ESD event. The reduced maximum voltage correlates to improved part reliability.

In one embodiment, clamp control circuit 204 may also be configured to receive a control signal (RC) 240. RC signal 240 may correspond to an RC time constant, and may serve as a trigger (enable) signal to clamp control circuit 204. In case there is a power surge on VIOESD rail 244 resulting from normal operation, for example from powering up the system/part, which may not have the harmful effects of an ESD pulse, RC signal 240 may operate to keep clamp control circuit 204 disabled even if VIOESD rail 244 provides enough power to clamp control circuit 204 for clamp control circuit 204 to assert ESD control signal 230. Thus, the RC time constant to which RC signal 240 corresponds may correlate to a specified slope of an energy pulse that may result in VIOESD rail 244 providing enough power to clamp control circuit 204 for clamp control circuit 204 to enable ESD control signal 230. Generally, an ESD event generates a voltage spike having a steep slope, in which case RC signal 240 would operate to enable clamp control circuit 204, while a lower slope present during a routine powering up of the system/part would result in RC signal 240 keeping clamp control circuit 204 disabled. It should also be noted that VIOESD 244 and VDDIO 122 may in fact be the same power/supply rail, and alternate embodiments may be configured with a single power rail providing power to the circuit and/or system components that are powered by VIOESD 244 and VDDIO 122 in the embodiment shown in FIG. 2. In general, the ESD rail and the power supply rail can be the same supply rail, and separate supply rails (e.g. VIOESD 244 and a distinct VDDIO 122) may not be required.

In one set of embodiments, a system, e.g. an integrated circuit or part, may include a plurality of physical pads and associated pad circuits (e.g. pad circuit 102) together operating as digital I/O pads. In case of an ESD event affecting one or more of the digital I/O pads, the PMOS devices configured between the I/O supply rail and the output pad—within their respective pad circuits in the affected digital I/O pads—may all be turned on. This may allow the capacitance of each pad, in some embodiments approximately 3 pF capacitance per pad, to charge up, absorbing the energy of the ESD event and reducing the peak voltage the integrated circuit or part experiences as a result of the ESD event. The reduced peak voltage may be directly correlated with improved ESD performance of the product.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A pad circuit configured to provide protection against electrostatic discharge (ESD) in a system comprising the pad circuit, the pad circuit comprising:
   a first node coupled to a first voltage rail;
   a second node coupled to a physical pad having capacitance;
   one or more output transistor devices coupled between the first node and the second node, and operable to at least partially drive an output signal at the second node;
   a control block configured, to turn on, when instructed, at least one of the one or more output transistor devices to charge the pad capacitance to reduce a maximum voltage developed in the system as a result of the ESD event;
   a clamp device configured between a second voltage rail and a third voltage rail to reduce, when turned on, the maximum voltage developed in the system as the result of the ESD event;
   enable circuitry configured to turn on the clamp device and instruct the control block to turn on the at least one of the one or more output transistor devices, in response to the ESD event;
   wherein the second voltage rail is configured to provide power to the enable circuitry, and wherein the third voltage rail has a value below the first voltage rail.

2. The pad circuit of claim 1, wherein in turning on the at least one of the one or more output transistor devices when instructed, the control block couples an associated capacitance of the first voltage rail to the physical pad to share a charge developed in the system in response to the ESD event, to reduce the maximum voltage developed in the system as the result of the ESD event.

3. The pad circuit of claim 1, wherein the one or more output transistor devices are PMOS devices.

4. The pad circuit of claim 3, further comprising one or more NMOS devices coupled between the second node and the third voltage rail, wherein the NMOS devices and the PMOS devices are operable to operate together to drive the output signal at the second node, wherein the control block operates to turn off the NMOS devices during the ESD event.

5. The pad circuit of claim 1, wherein the pad circuit and the physical pad are comprised in a digital input/output pad.

6. A circuit configured to provide protection against electrostatic discharge (ESD) in a system comprising the circuit, the circuit comprising:
   an output buffer configured to couple to a physical pad having capacitance, to drive at least one output signal at the physical pad;
   a control block configured to control the output buffer;
   a clamp device coupled between a first supply rail and a low supply rail, wherein the clamp device is configured to absorb, when turned on, a portion of an energy generated by the ESD event, to reduce the maximum voltage developed in the system as the result of the ESD event; and
   a control circuit configured to instruct the control block to activate at least a portion of the output buffer when an ESD event occurs, to charge the pad capacitance to reduce a maximum voltage developed in the system as a result of the ESD event, wherein the control circuit is further configured to turn on the clamp device in response to the ESD event;
   wherein the first supply rail is configured to provide power to the control circuit.

7. The circuit of claim 6, wherein the output buffer comprises:
   one or more PMOS devices coupled between a second supply rail and the physical pad; and
   one or more NMOS devices coupled between the physical pad and the low supply rail wherein the low supply rail has a value less than the second supply rail;
   wherein in activating at least a portion of the output buffer when the ESD event occurs, the control block enables one or more of the one or more PMOS devices.

8. The circuit of claim 7, wherein in activating at least a portion of the output buffer when the ESD event occurs, the control block disables one or more of the one or more NMOS devices.

9. The circuit of claim 7, wherein the one or more PMOS devices comprise a plurality of PMOS devices coupled in parallel between the second supply rail and the physical pad, and the one or more NMOS devices comprise a plurality of NMOS devices coupled in series between the physical pad and the second supply rail.

10. The circuit of claim 6, wherein the clamp device is one of:
    a PMOS device having its source terminal coupled to the first supply rail, its drain terminal coupled to the low supply rail, and its gate terminal coupled to the control circuit; or
    an NMOS device having its drain terminal coupled to the first supply rail, its source terminal coupled to the low supply rail, and its gate terminal coupled the control circuit.

11. The circuit of claim 6, wherein the first supply rail is configured to provide increased power during the ESD event.

12. The control circuit of claim 6, wherein in instructing the control block to activate at least a portion of the output buffer when an ESD event occurs, the control circuit is operable to provide a control signal to the control block in response to the ESD event.

13. The circuit of claim 6, wherein the control circuit is configured to receive a control signal corresponding to a time constant, wherein the time constant corresponds to a specified slope, wherein the control signal is configured to trigger the control circuit if a slope of a voltage pulse developed in the system as a result of the ESD event is greater than or equal to the specified slope.

14. A system comprising:
    one or more pads, each pad comprising:
       a respective physical pad having respective capacitance;
       a respective clamp device configured to absorb, when turned on, a portion of an energy generated by an ESD event, to thereby further reduce the maximum voltage developed in the system as the result of the ESD event; and
       a respective pad circuit comprising:
          a respective output buffer coupled to the respective physical pad, and operable to drive at least one respective output signal at the respective physical pad; and
          respective control circuitry operable to:
             activate at least a portion of the respective output buffer in response to an ESD event to charge the respective pad capacitance to reduce a maximum voltage developed in the system as a result of the ESD event; and
             turn on the clamp device in response to the ESD event.

15. The system of claim 14, further comprising functional circuitry coupled to the respective pad circuit of at least one of the one or more pads, wherein the functional circuitry is operable to generate the at least one respective output signal driven by the respective pad circuit of the at least one of the one or more pads.

16. The system of claim 14, further comprising a first supply rail configured to provide increased power in accordance with the ESD event, and further configured to power the respective control circuitry of the respective pad circuit of each pad.

17. The system of claim 16, further comprising a second supply rail configured to power the respective output buffer of the respective pad circuit of each pad.

18. The system of claim 16, wherein the respective control circuitry of the respective pad circuit of each pad is configured to receive a respective control signal corresponding to a time constant, wherein the time constant corresponds to a specified slope, wherein the respective control signal is configured to trigger the respective control circuitry if a slope of a voltage pulse developed in the system as a result of the ESD event is greater than or equal to the specified slope.

* * * * *